United States Patent [19]
Aldrin

[11] Patent Number: 5,184,789
[45] Date of Patent: Feb. 9, 1993

[54] SPACE STATION FACILITY

[76] Inventor: Buzz Aldrin, 233 Emerald Bay, Laguna Beach, Calif. 92651

[21] Appl. No.: 654,742

[22] Filed: Feb. 12, 1991

[51] Int. Cl.⁵ .............................................. B64G 1/10
[52] U.S. Cl. ................................. 244/159; 52/79.12; 52/81; 52/DIG. 10
[58] Field of Search ................... 244/158 R, 159, 161, 244/173; 52/79.4, 79.12, 81, 648, DIG. 10

[56] References Cited

U.S. PATENT DOCUMENTS

| | | | |
|---|---|---|---|
| 3,618,273 | 7/1969 | Crandall | 52/79.12 |
| 4,482,900 | 11/1984 | Bilek et al. | 52/DIG. 10 |
| 4,723,382 | 2/1988 | Lalvani | 52/81 |
| 4,860,975 | 8/1989 | Schliesing et al. | 244/161 |

OTHER PUBLICATIONS

Astro, EP 0288323, European Pat. Application published Oct. 26, 1988.
"Space Flight", *Flight International* 16 Mar. 1967 pp. 420-421.
"The Space Station," by Kent Alexander, dated 1988.
"An Evolutionary Space Station Architecture," Journal of the British Interplanetary Society by O. P. Harwood, pp. 305-314, dated 1985.
"The Infrastructure of Space Exploration," by O. P. Harwood, pp. 1-42, dated 1987.

*Primary Examiner*—Galen Barefoot
*Attorney, Agent, or Firm*—Poms, Smith, Lande & Rose

[57] ABSTRACT

A space station facility having a plurality of elongated members which form a cuboctahedral-shaped structure surrounding a central pressurized command module. The space station facility may be orbited as a space station, or used as part of a larger space station. The elongated members are all of equal length, and are used to form eight tetrahedral-shaped modules or berthing spaces, and six pyramidal-shaped modules or berthing spaces. Access to berthing ports on the central command module is provided through the fourteen berthing spaces. The elongated members may be hinged at the midpoints thereof to facilitate carrying the members in the cargo bay of a space shuttle, and for deployment in space during assembly of the space station facility.

16 Claims, 4 Drawing Sheets

5,184,789

SPACE STATION FACILITY

BACKGROUND OF THE INVENTION

The present invention relates generally to space stations, and more particularly to a space station facility having a plurality of elongated members which form a cuboctahedral-shaped structure surrounding a pressurized command module.

Space stations are needed to undertake outer space missions to the planets, or throughout the solar system. In order to carry out such missions, some planners favor assembling a large spacecraft at a space station in low Earth orbit (LEO), and then propelling the spacecraft on its journey using large rocket engines. Others envision orbiting space stations permanently between Earth and the planets. In both cases, it is necessary to assemble the space stations in outer space.

Assembling space stations in outer space is expensive and time consuming because space shuttles are needed to transport the various components of the space stations to LEO where they are assembled. If components of a space station are large or heavy, then increased cargo space is needed on the space shuttles, and the cost of the space station will be significantly increased.

SUMMARY OF THE INVENTION

It is an object of this invention to provide a space station facility that may be orbited as a space station, or used as part of a larger space station.

It is another object of this invention to provide a space station facility that may be easily assembled in outer space.

It is still another object of the invention to provide a space station facility that is lightweight and relatively economical to construct.

It is still another object of this invention to provide a space station facility that uses modular construction, and that can be expanded in size.

It is still another object of this invention to provide a space station facility that provides an outer structure which furnishes protection for a central pressurized command module.

It is still another object of this invention to provide a space station facility that provides access to berthing ports on a central command module.

These and other objects and advantages are attained by a space station facility having a plurality of elongated members which form a cuboctahedral-shaped structure surrounding a central pressurized command module. The space station facility may be orbited as a space station, or used as part of a larger space station. The elongated members are all of equal length, and are used to form eight tetrahedral-shaped modules or berthing spaces, and six pyramidal-shaped modules or berthing spaces. Access to berthing ports on the central command module is provided through the berthing spaces. The elongated members may be hinged at the midpoints thereof to facilitate carrying the members in the cargo bay of a space shuttle, and for deployment in space during assembly of the space station facility.

The various features of the present invention will be best understood together with further objects and advantages by reference to the following description of the preferred embodiment taken in conjunction with the accompanying drawings.

DESCRIPTION OF THE PREFERRED EMBODIMENT

The following specification taken in conjunction with the drawings sets forth the preferred embodiment of the present invention in such a manner that any person skilled in the art can make and use the invention. The embodiment of the invention disclosed herein is the best mode contemplated by the inventor for carrying out his invention in a commercial environment although it should be understood that various modifications can be accomplished within the parameters of the present invention.

Figure 1:
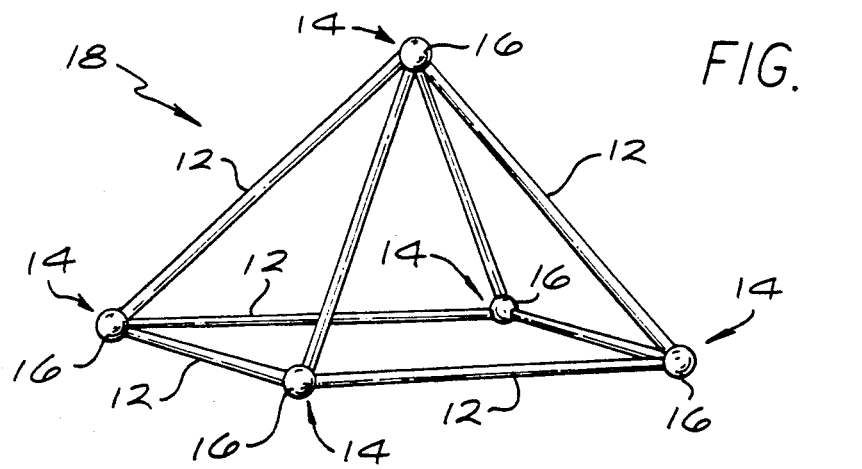
FIG. 1 is a perspective view showing how elongated members may be connected together to form a pyramidal-shaped module used for the space station facility of the present invention.
Figure 6:
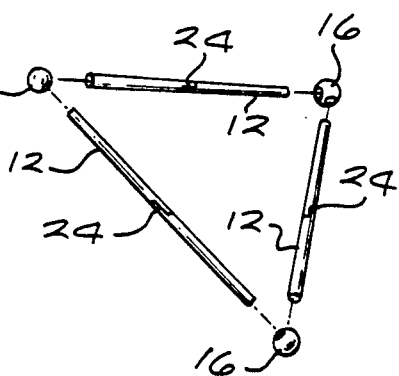
FIG. 6 is an exploded perspective view of one of the sides or faces of the tetrahedral-shaped module.
Figure 7:
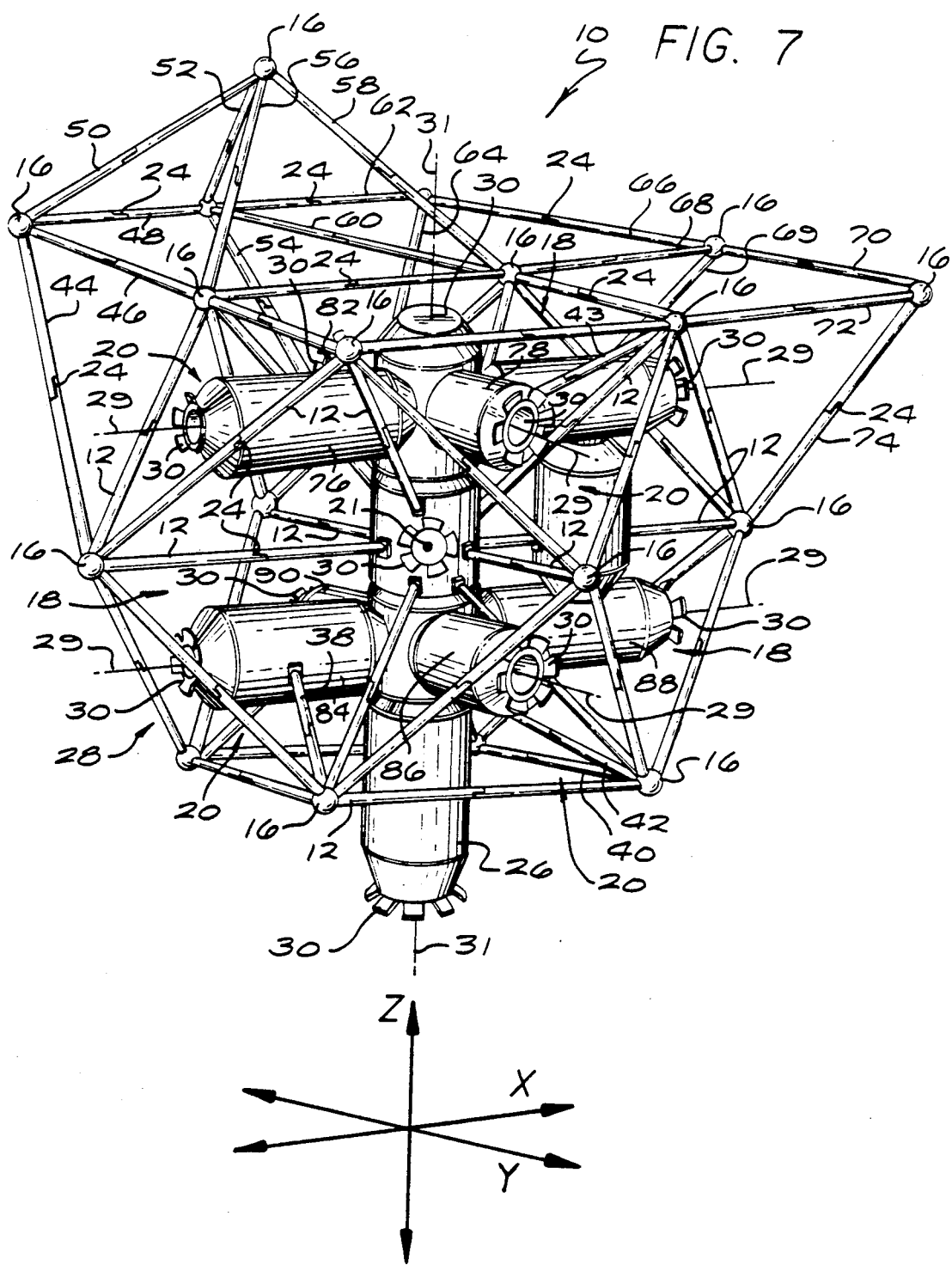
FIG. 7 is a perspective view of the space station facility showing a cuboctahedral-shaped structure formed by a plurality of elongated members surrounding a central pressurized command module.
Figure 8:
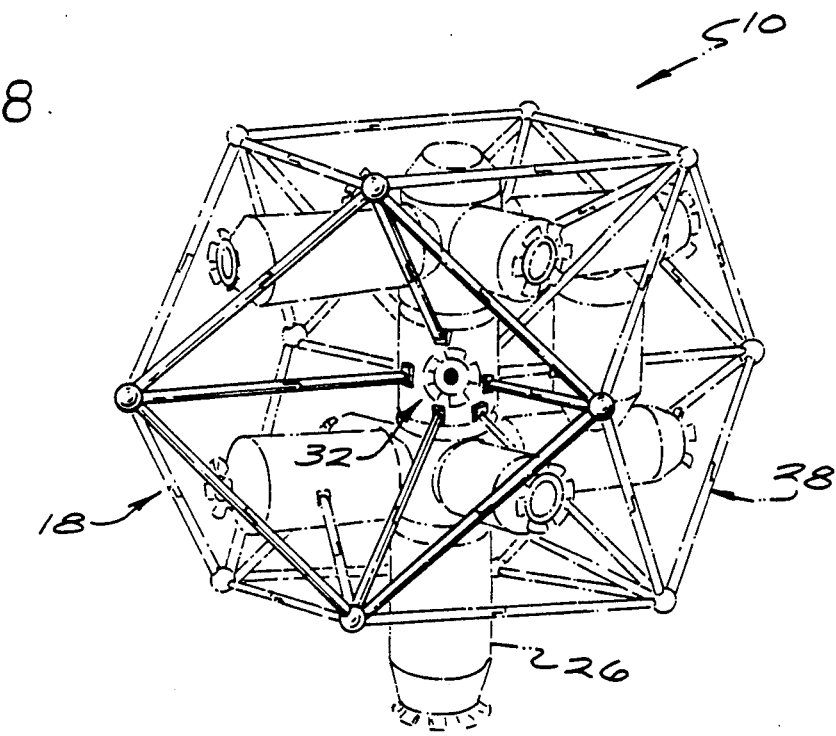
FIG. 8 is a perspective view of the space station facility showing how one of the pyramidal-shaped modules is used for the surrounding cuboctahedral-shaped structure, the remainder of the facility being represented by dashed lines.
Figure 9:
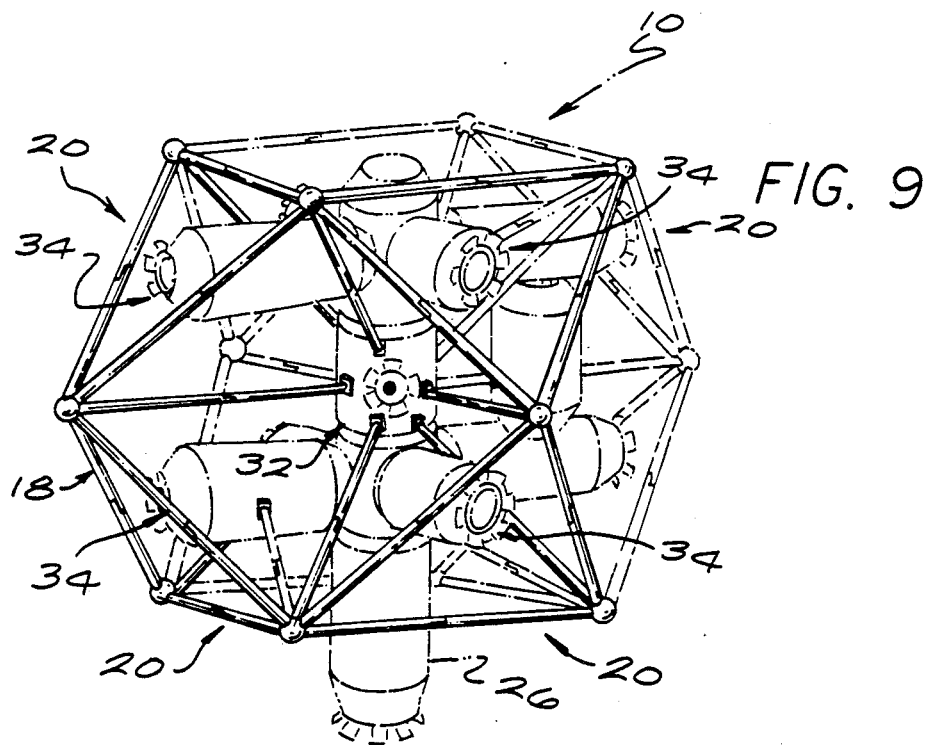
FIG. 9 is a perspective view of the space station facility showing how one of the pyramidal-shaped modules is connected to four adjacent tetrahedral-shaped modules for the purpose of forming the cuboctahedral-shaped structure, the remainder of the facility being represented by dashed lines.

A preferred embodiment of the space station facility 10 of the present invention is shown in FIGS. 7-9. FIGS. 1-6 show how elongated members 12 of equal length may be used to form modules for the space station facility 10. Referring to FIG. 1, eight elongated members 12 are shown connected at vertexes 14 by fasteners 16 in order to form a pyramidal-shaped module 18 having a square base and three sides or faces, each side forming an equilateral triangle.

Figure 2:
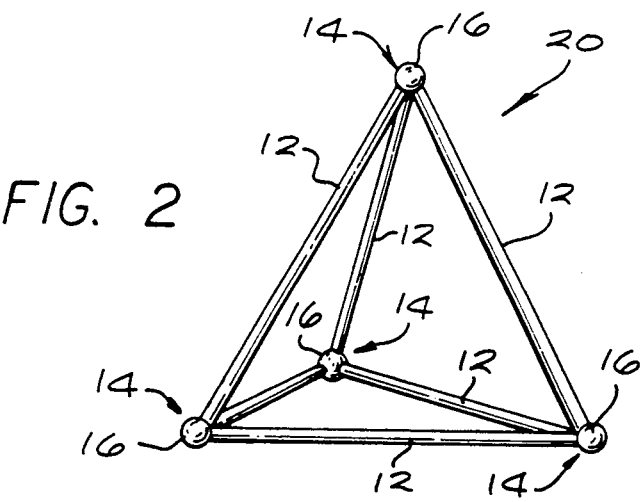
FIG. 2 is a perspective view showing how elongated members may be connected together to form a tetrahedral-shaped module used for the space station facility.

FIG. 2 illustrates how five equal length, elongated members 12 may be connected at vertexes 14 by fasteners 16 to form a tetrahedral-shaped module 20 for the space station facility 10. Each side, or face, and the base of the tetrahedral-shaped module 20 forms an equilateral triangle.

Figure 3:
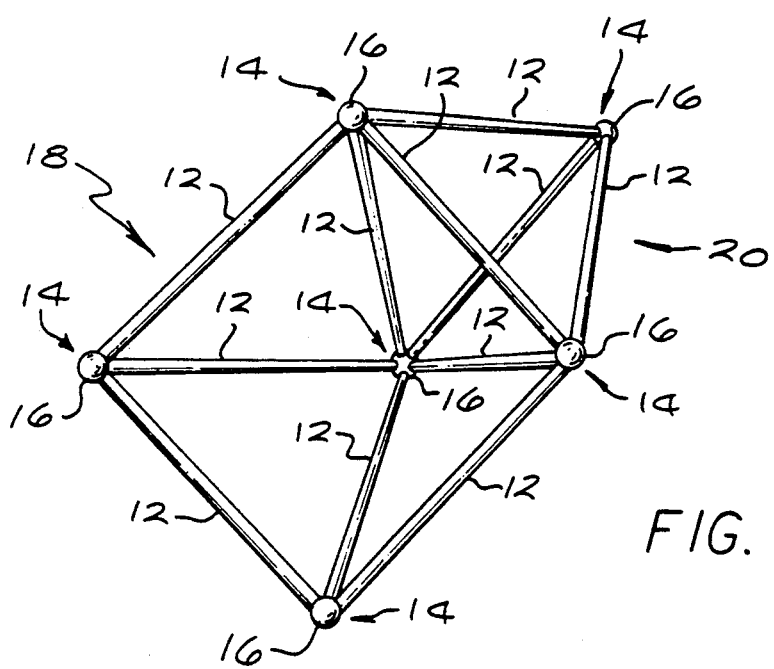
FIG. 3 is a perspective view showing how the pyramidal-shaped and tetrahedral-shaped modules may be connected together sharing three common vertexes in order to form a basic building structure for the space station facility.

As shown in FIG. 3, the pyramidal-shaped and tetrahedral-shaped modules 18 and 20 may be connected together sharing three common vertexes 14. As discussed below, the connected modules 18 and 20 form the basic building structure for the space station facility 10.

Figure 4:
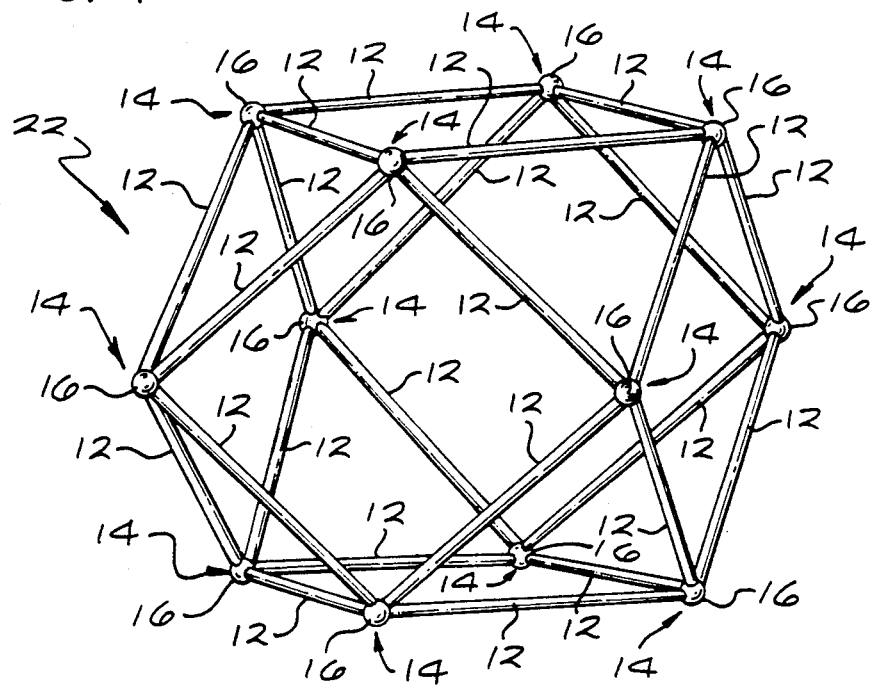
FIG. 4 is a perspective view showing how a cuboctahedral-shaped structure may be formed by connecting together at peripheral vertexes of the structure a plurality of elongated members to form six squares and eight equilateral triangles, each square being similar to a base of the pyramidal-shaped module and each equilateral triangle being similar to a base of the tetrahedral-shaped module.

FIG. 4 shows how a cuboctahedral-shaped structure 22 may be formed by connecting together at peripheral vertexes 14 of the structure 22 a plurality of elongated members 12 to form six square configurations and eight equilateral triangular configurations. As discussed below, a cuboctahedral-shaped structure is used for the space station facility 10. Each square configuration is similar to the square base of the pyramidal-shaped module 18, and each equilateral triangular configuration is similar to the triangular base of the tetrahedral-shaped module 20. Note that the cuboctahedral-shaped structure 22 would have elongated members 12 directed radially inward toward a center of the structure 22 if the basic building structure shown in FIG. 3 was used to form structure 22. However, these inwardly directed members 12 were omitted from FIG. 4 for purposes of illustration (see FIG. 7 for inwardly directed elongated members 12).

Figure 5:
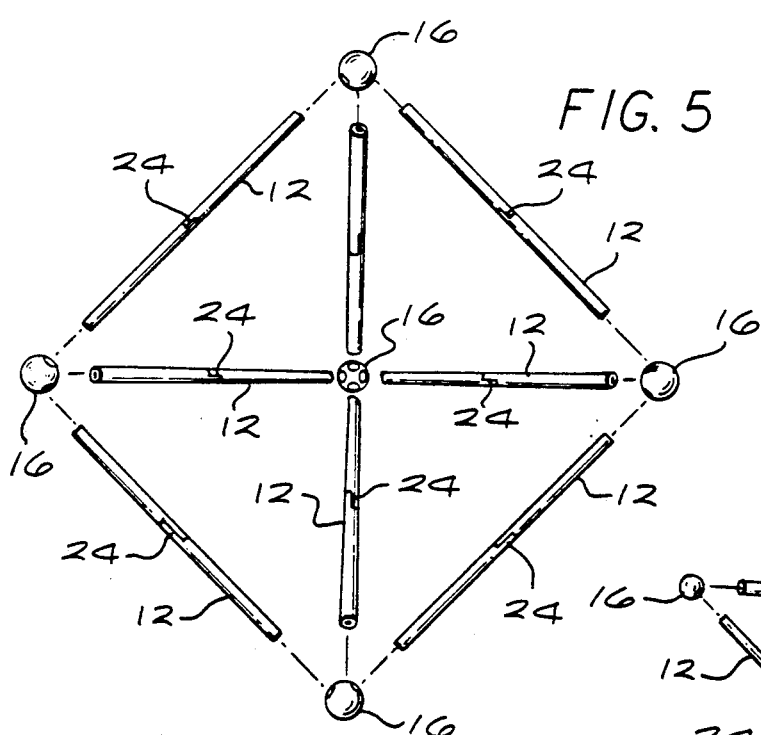
FIG. 5 is an exploded plan view taken in the direction of the base of the pyramidal-shaped module.

The exploded views of FIGS. 5 and 6 show how the elongated members 12 are connected together at vertexes 14 by fasteners 16. Elongated members 12 may be hinged at the midpoints thereof, if desired, as shown in FIGS. 5 and 6. If hinges 24 are used at the midpoints of the elongated members 12, the hinges 24 would facilitate carrying the members 12 in the cargo bay of a space shuttle because the members 12 can be folded in half. In addition, the hinges 24 facilitate deployment of the elongated members 12 in space during assembly of the space station facility.

The space station facility 10 is shown in FIG. 7. Facility 10 has a central pressurized command module 26 which is surrounded by a cuboctahedral-shaped structure 28 formed by six pyramidal-shaped modules 18, and eight tetrahedral-shaped modules 20. FIGS. 8 and 9 illustrate how each pyramidal-shaped module 18 is connected to four adjacent tetrahedral-shaped modules 20 for the purpose of forming surrounding structure 28.

Note that one elongated member 12 is directed radially inward from each peripheral vertex 14 toward a center 21 of structure 28 (see FIG. 7), having one end thereof connected to its corresponding fastener 16 at the vertex and the other end thereof connected to the command module 26. Each pyramidal-shaped module 18 has four elongated members 12 directed radially inward toward the command module 26, and each tetrahedral-shaped module 20 has three members 12 directed radially inward. As a result, the cuboctahedral-shaped structure 28 is securely held to the command module 26.

As shown in FIG. 7, the central command module 26 has a plurality of berthing ports 30. These ports 30 may be used, for example, to connect small transfer taxies, propulsion stages, etc. Modules 18 and 20 provide berthing spaces 32 and 34 (see FIGS. 8 and 9), respectively, which furnish access to the berthing ports 30.

Referring again to FIG. 7 and using perpendicular axes x, y, and z for reference purposes, the command module 26 preferably has its longitudinal axes 31 aligned in the direction of the z axis (which will be referred to as the vertical direction), and passing through the center 21 of structure 28. Axes x and y lie in a horizontal plane and are perpendicular to each other and to axis z, all three axes forming right angles with each other. As shown in FIG. 7, four elongated members 12 of structure 28 have longitudinal axes that pass through center 21 of structure 28 and lie on a horizontal plane like axes x and y.

Command module 26 preferably has eight horizontally-oriented pressure vessels 76 through 90 with berthing ports 30. Four of the pressure vessels 76 form right angles as shown and have longitudinal axes 29 that lie in a horizontal plane above center 21. The other four vessels 84, 86, 88 and 90 also form right angles as shown and lie in a horizontal plane below center 21.

As shown in FIG. 7, four of the vessels 76, 80, 84 and 88 have longitudinal axes 29 parallel to axis x and to two of the horizontal members 12 passing through center 21. The four other vessels 78, 82, 86 and 90 have longitudinal axes parallel to axis y and to the two other horizontal members 12 passing through center 21. As a result, ports 30 of the eight horizontal vessels 76 through 90 are conveniently located within the eight berthing spaces 34 of the tetrahedral-shaped modules 20, providing access to the ports during docking maneuvers.

It is important to note that any desirable member of horizontal pressure vessels 76 through 90 and/or ports 30 may be used. Also, the pressure vessels are preferably oriented parallel to axes x and y. However, minor changes in the orientation of some or all of the pressure vessels is not intended to limit the scope of the present invention.

Surrounding structure 28 furnishes protection for the central pressurized command module 26, for example, during docking when a docking vehicle misses its berthing port. In such a case, the elongated members 12 will prevent the docking vehicle from hitting or running into the command module 26. Therefore, surrounding structure 28 both provides access to the berthing ports 30 and protects against damage to the command module 26 during docking maneuvers.

Referring again to FIG. 7, any number of additional elongated support struts or members of any desirable length, such as struts, 38, 40, 42 and 43, may be connected to the command module 26 and structure 28 to furnish further support, or for any desirable reason. Furthermore, additional elongated members may be added to the cuboctahedral-shaped structure 28, for example, like members 44 through 74 added to the top of structure 28. Members 44 through 74 can vary in length and may be used to support solar panels, to connect the space station facility 10 to a larger space station, or for any desirable reason. The space station facility 10 may also be used by itself as an orbiting space station.

Because standard modules 18 and 20 are used for structure 28, the size of the space station facility 10 may be expanded to an even larger size periphery by simply connecting additional radially-oriented elongated members 12 to the fasteners 16 located at vertexes 14 on the existing outer periphery of the structure 28. Additional fasteners 16 would then be connected to the outer ends of the additional radial members 12, and additional elongated members 12 would be connected to the additional fastners 16 at new outer vertexes 14 to form new larger equilateral triangles and squares, forming a new larger size periphery for the space station facility 10. This procedure may be repeated as often as desired to form any desirable size facility lo. Also, the length of the elongated members 12 may be varied to form any desirable size facility 10.

Any type of fastener 16 or hinge 24 may be used for the space station facility 10. It is intended that this invention not be limited by any particular type of fastener 16 or hinge 24. In addition, any type of lightweight, high-strength material may be used for the elongated members 12, such as any lightweight metal or composite material. Each of the elongated members 12 is about 45 feet in length, and the command module 26 is about 14¼ feet in diameter. However, any desirable dimensions may be used for the elongated members 12 and module 26. Also, members 12 may be tubular, solid, or have any desirable cross-section. Any number of berthing ports 30 may be used for the space station facility 10, and command module 26 may have any desirable configuration and may be oriented in any desirable position with respect to structure 28.

The above description discloses the preferred embodiment of the present invention. However, persons of ordinary skill in the art are capable of numerous modifications once taught these principles. Accordingly, it will be understood by those skilled in the art that changes in form and details may be made to the above-described embodiment without departing from the spirit and scope of the invention.

I claim:

1. A space station facility for use in outer space, comprising:
   a pressurized module having berthing ports; and
   a cuboctahedral-shaped structure connected to said pressurized module and surrounding said pressurized module so that said module is substantially centrally located within said structure, said cuboctahedral-shaped structure including a plurality of elongated members connected together to form a cuboctahedral shape, and to provide access to said berthing ports, said elongated members being of equal length and said cuboctahedral-shaped structure comprising six pyramidal-shaped modules formed by said elongated members which are connected to eight tetrahedral-shaped modules formed by said elongated members, each of said pyramidal-shaped modules having a square base and four equilateral triangular sides with a vertex thereof connected to said pressurized module near a center of said cuboctahedral-shaped structure.

2. The space station facility of claim 1 wherein each of said tetrahedral-shaped modules has four equilateral triangular sides with a vertex thereof connected to said pressurized module near said center of said cuboctahedral-shaped structure.

3. The space station facility of claim 2 wherein said six pyramidal-shaped modules provide six pyramidal-shaped berthing spaces which furnish access to said berthing ports, and said eight tetrahedral-shaped modules provide eight tetrahedral-shaped berthing spaces which furnish access to said berthing ports.

4. The space station facility of claim 3 wherein said elongated members are hinged at the midpoints thereof in order to facilitate deployment in outer space.

5. The space station facility of claim 4 wherein said elongated members are about 45 feet long, and said pressurized module has a diameter of about 14½ feet.

6. A space station facility for use in outer space, comprising:
   a pressurized module having berthing ports; and
   a cuboctahedral-shaped structure connected to said pressurized module and surrounding said pressurized module so that said module is substantially centrally located within said structure, said cuboctahedral-shaped structure being formed from a plurality of elongated members of equal length so that access is provided to said berthing ports and said cuboctahedral-shaped structure having six square-shaped faces and eight equilateral triangular-shaped faces at an outer periphery thereof, said pressurized module having a vertically-oriented longitudinal axis substantially passing through a center of said cuboctahedral-shaped structure and substantially through centers at a top one of said square-shaped faces and a bottom one of said square-shaped faces, said top and bottom square-shaped faces being horizontally oriented, said cuboctahedral-shaped structure comprising six pyramidal-shaped modules formed by said elongated members which are connected to eight tetrahedral-shaped modules formed by said elongated members, each of said pyramidal-shaped modules having one of said square-shaped faces as its base and four equilateral triangular sides with a vertex thereof connected to said pressurized modular near a center of said cuboctahedral-shaped structures.

7. The space station facility of claim 6 wherein each of said tetrahedral-shaped modules has one of said equilateral triangular-shaped faces as its base and three equilateral triangular sides with a vertex thereof connected to said pressurized module near said center of said cuboctahedral-shaped structure.

8. The space station facility of claim 7 wherein said six pyramidal-shaped modules provide six pyramidal-shaped berthing spaces which furnish access to said berthing ports, and said eight tetrahedral-shaped modules provide eight tetrahedral-shaped berthing spaces which furnish access to said berthing ports.

9. The space station facility of claim 8 wherein said elongated members are hinged at midpoints thereof in order to facilitate deployment in outer space.

10. A space station facility for use in outer space, comprising:
    a pressurized module having berthing ports; and
    a cuboctahedral-shaped structure connected to said pressurized modular and surrounding said pressurized module so that said module is substantially centrally located within said structure, said cuboctahedral-shaped structure comprising a plurality of elongated members of equal length connected together to provide access to said berthing ports and to form a cuboctahedral shape including:
    (a) six pyramidal-shaped modules, and
    (b) eight tetrahedral-shaped modules connected to said six pyramidal-shaped modules, each of said modules having a vertex thereof connected to said pressurized module near a center of said cuboctahedral-shaped structure, each of a selected number of said modules providing an unobstructed space for access to one of said berthing ports.

11. The space station facility of claim 10 wherein each of said pyramidal-shaped modules has a square base and four equilateral triangular sides.

12. The space station facility of claim 11 wherein each of said tetrahedral-shaped modules has four equilateral triangular sides.

13. The space station facility of claim 12 wherein said unobstructed spaces for access to said berthing ports are pyramidal-shaped berthing spaces provided by said pyramidal-shaped modules, and tetrahedral-shaped berthing spaces provided by said tetrahedral-shaped modules.

14. The space station facility of claim 13 wherein said elongated members are hinged at midpoints thereof in order to facilitate deployment in outer space.

15. The space station of claim 10 wherein some of said berthing ports are located on pressurized vessels extending outward from said pressurized module, said module having a vertically-oriented longitudinal axis that substantially passes through a center of said cuboctahedral shape, said pressurized vessels having longitudinal axes horizontally oriented so that access to said ports located on said pressurized vessels is provided through said unobstructed spaces of said tetrahedral-shaped modules.

16. The space station of claim 15 wherein said pressurized module has four berthing ports located on four pressurized vessels disposed above said center of said cuboctahedral shape, and has four berthing ports located on four pressurized vessels disposed below said center of said cuboctahedral shape.

* * * * *